United States Patent [19]

Bales

[11] 3,754,573

[45] Aug. 28, 1973

[54] MULTIPURPOSE GAS METER CHANGE VALVE

[76] Inventor: John K. Bales, 1814 N. 52 St., Phoenix, Ariz.

[22] Filed: Aug. 16, 1971

[21] Appl. No.: 172,011

[52] U.S. Cl. .............................................. 137/608
[51] Int. Cl. ............................................ F17d 1/00
[58] Field of Search ............... 137/608, 612.1, 454.5

[56] References Cited
UNITED STATES PATENTS

| | | |
|---|---|---|
| 3,240,230 | 3/1966 | Callahan, Jr. et al. ............... 137/608 |
| 3,348,570 | 10/1967 | Nealy ............................ 137/454.6 X |
| 3,280,834 | 10/1966 | Zahuranec ...................... 137/612.1 |
| 2,288,913 | 7/1942 | Moecker, Jr. et al. ............ 138/45 X |
| 2,871,881 | 2/1959 | Hewson .......................... 137/608 X |
| 2,980,132 | 4/1961 | Prijatel et al. ................. 137/454.5 X |
| 3,260,278 | 7/1966 | Lund et al. ................... 137/454.5 X |
| 3,298,396 | 1/1967 | Gressman et al. ............... 137/608 X |

*Primary Examiner*—Samuel Scott
*Attorney*—A. John Michel

[57] ABSTRACT

A device to be used when it is desired periodically to change gas meters for inspection (as is required by most State laws) or gas pressure regulators without causing any interruption of the flow of gas to the customer. While the meter and regulator are being changed, a pair of the devices of the inveniton are connected, one into the semi high pressure line, and the other into the low pressure customer's house piping. The device may also be used by gas service companies etc. as a means for shutting off meters during vacancies of apartments or houses.

1 Claim, 4 Drawing Figures

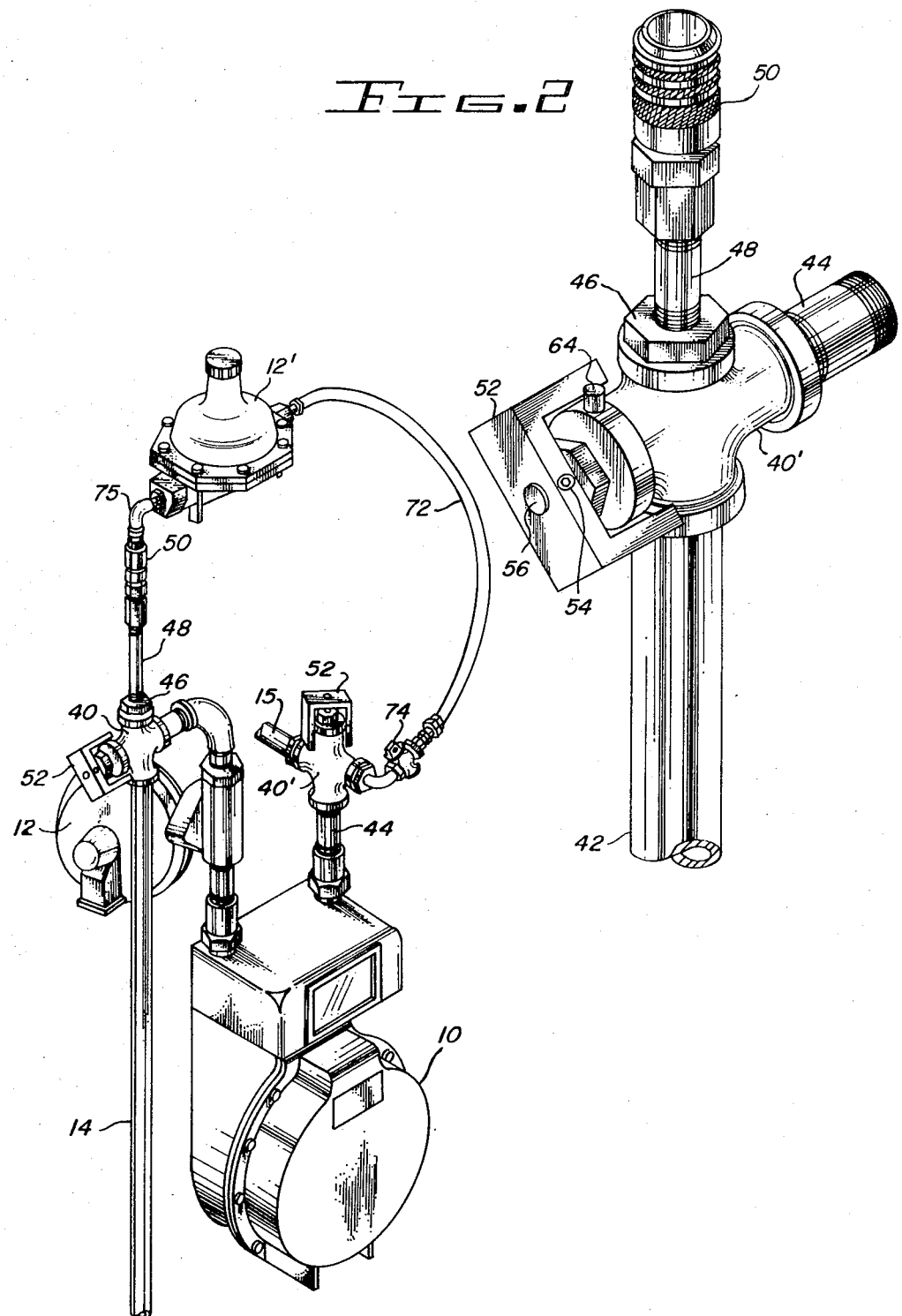

INVENTOR.
JOHN K. BALES

MULTIPURPOSE GAS METER CHANGE VALVE

This invention relates to methods and new and useful improvements in multipurpose gas meter change valves, and more particularly to such devices which are adapted to facilitate and simplify the changes of gas meters and similar devices.

It is an object of the present invention to provide a method of and means for enabling the changing or replacing of a gas meter or the like without interrupting the gas supply to the user.

It is another object of this invention to provide instrumentalities adapted to eliminate the conventional purging of air from house lines and the consequent relighting of gas appliance pilots. Heretofore, there have been many suggestions and devices to perform this service, some of them involving the use of trucks carrying bottled gas under high pressure. However, none of these devices and suggestions have proved satisfactory because of the danger of transporting bottled gas mounted on a hand cart which requires a special ramp for loading and unloading this equipment into the van type truck which is being used by most of the manufactured and natural gas serving companies.

Another advantage of this invention is that the gas serviceman merely has to carry with him a small kit and the semi high pressure regulator when it is necessary to effect the periodical routine meter change of all gas meters for meter shop testing.

Still another advantage of this invention resides in that it eliminates many of the standard pipe fittings necessary to prepare the meter loop for the installation of a new meter. This invention is designed with many built-in features and is permanently located in the meter loop at locations to best serve this purpose as it is a permanent part of the loop.

The above and other objects and advantages of this invention may be more readily understood from the following description thereof when read in connection with the accompanying drawings in which:

FIG. 1 shows a perspective view of a gas meter installation with the usual accessories;

FIG. 2 shows a detail of FIG. 1 with a part of the meter change kit;

Figure 3:
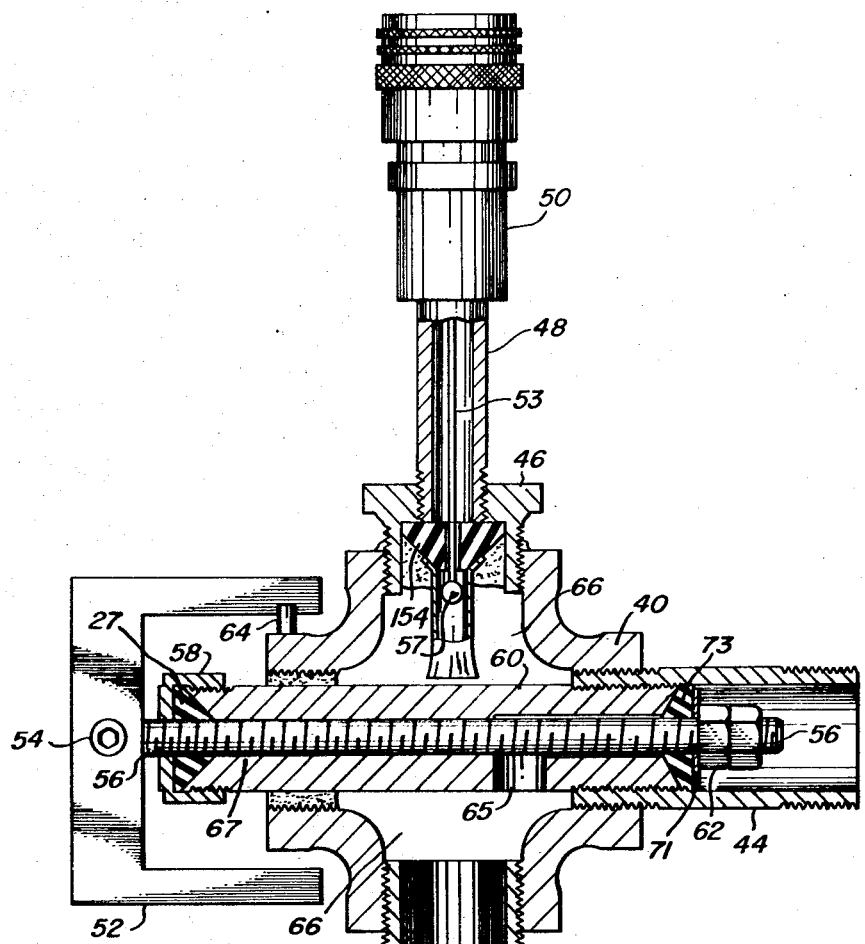
FIG. 3 shows a typical embodiment of the invention partly broken away to expose a fragmentary longitudinal section of the major components thereof.

Referring now more particularly to the drawing:

FIG. 1 depicts a gas meter 10 to be replaced by the method of this invention. The meter 10 is shown connected to a standard house appliance regulator 12, the purpose of which is to reduce the pressure of the gas main 14 to a safe pressure. Members 40 and 40' represent two substantially identical valves of this invention to be described herein.

As shown in the drawings and more particularly in FIG. 3, the invention provides a hollow four-way metal casting 40 (FIGS. 2 and 3), which is threaded at its four ends. Threadedly connectable to three ends of member 40 are: first, pipe 42 (FIG. 2) which is identical with or may serve to establish a connection to the main high pressure gas service line 14; secondly, threaded pipe nipple 44 which is connectable at its right hand end with the input line to gas meter 10 and/or the gas regulator 12, and on its left hand end with cylindrical core member 60; thirdly, pipe reducer bushing 46 which is tapped centrally and adapted to receive pipe nipple 48 and air hose connector 50; the fourth end of the four-way casting 40 is adapted to receive a handle member 52 which is operatively connected, via set screw 54, to a threaded central rod member 56.

The hollow interior of casting 40 defines a gas chamber 66 which communicates with the three pipes connected to the three projections or ends of member 40. Member 60 is provided with an aperture 65 extending into gas chamber 66 surrounding member 60. That part of the inner cylindrical surface of core member 60 which extends from its left extremity substantially to the aperture 65 therein, is provided with screw threads meshing with the threads of rod 56.

Thus, the threaded rod 56 is axially movable along its longitudinal axis within the screw threads 67 of core member 60 by handle 52 which is secured to rod 56 by bolt 54, and the flow of gas through orifice 65, the tubing 44, and gas meter 10 can be quickly turned on or off by means of turning vlave handle 52 a quarter of a turn.

On the left, or handle side end, rod 56 is surrounded by a gas tight rubber washer 27 which is adapted to be threadedly engaged and tightened by packing nut 58 engaging the left end of core member 60; on its right-hand end, threaded rod 56 is held in place in core member 60 by nuts 62 which are designed, in cooperation with metal washer 71, gas tight rubber washer 73, stem 56 and handle 52, to control the flow of gas from chamber 66 through the pipe nipple 44.

The left-hand end of four-way casting 40 is provided with a stop member 64 adapted to limit the rotary manual motion of gas supply or control handle 52.

Threaded pipe nipple 44 is threaded internally at the left end thereof so that it threadedly fits over the hollow core member 60.

Gas hose or tube 50 does not form a permanent integral part of this invention, but is used temporarily at the time of the meter change.

Figure 4:
FIG. 4 is a schematic section of a detail view of FIG. 1.

The operation of the invention is as follows:

Assume that a gas meter such as meter 10 in the drawing is to be removed from a service line including main gas line 14, consumer line 15, and two of the devices of this invention shown at 40 and 40'. Normally, the pressure regulator 12 will also be connected in the supply line 14, 15. First, the serviceman removes the small head plug 47 (FIG. 4) from gas valve element 46 (element 46 is welded permanently into the body of valve housing 40). During this operation, escape of high pressure gas from the line 14 into the atmosphere is avoided by small rubber ball (check valve) 57 being held by the gas pressure against the opening in rubber valve seat washer 154. Next, the operator inserts plunger element 53 (FIG. 4) and holds the plunger in place temporarily by tubular hosing 48. An internal gas pressure of say 30 lb. pressure p.s.i. keeps rubber check valve 57 closed against its seat 154. Now, the transient or temporary pressure regulator 12' is inserted in the line as shown by means of adapter 75. Permanently installed regulator 12 normally reduces the high pressure from the main line 14 to a desired lower pressure, whereas regulator 12' is needed to reduce the gas pressure only at the time of the meter change. Low pressure gas enters service hose 72 and thence to connector valve 74 which is closed. Connector valve 74 is then connected to the customer's side of the meter 10. As stated above, valves 40 and 40' of this invention form a permanent part of the consumer's installation.

With all the above components connected in place, the serviceman closes valve 40 and 40' and is now ready to disconnect meter 10 without any gas escaping into the atmosphere. The replacement meter may now be installed without causing any interruption of the flow of gas to the customer.

Substantially the same procedure may be used for replacing line regulator 12 whenever such an operation becomes desirable.

It will be understood that components including fitting 50, regulator 12, rubber hose 72 and shut-off valve fitting 74 are all readily removable from the gas conduit system, and that they will be removed after each installation or meter change. However, the valves 40 and 40' remain in the line as permanent parts of the consumer's installation.

It will also be understood that the two gas valves of this invention, i.e., valves 40 and 40', when used in performing the quick meter change, are identical in looks and design. The only requirement is that the one-fourth inch Buna-A rubber ball 57 which in valve 40 acts as a check valve to control semi high pressure gas of say 15 to 50 pounds per square inch pressure, be removed from the valve 40 when this valve is used on the low pressure or customer side of meter 10.

While the foregoing specification sets forth the invention in specific terms, it is to be understood that numerous changes in the shape, size, components and materials may be resorted to without departing from the spirit and scope of the invention as claimed hereinafter.

What is claimed is:

1. A device for permitting the changing of gas meters and gas appliance regulators without interrupting the flow of gas in a consumer gas line;
    said device comprising, in combination, a four-way tubular casting forming an outer hollow housing and an inner flow chamber for gas;
    said four-way housing having four threaded terminal connections for interconnection in said gas line and for the controlled by-passing or shunting of the flow of gas from said meter when said meter is disconnected;
    tubular means inside said housing flow chamber; said tubular means being threaded over substantial portions of its inner and outer cylindrical surfaces and having an aperture in its wall; said aperture communicating with said gas chamber;
    a threaded actuator rod movable axially in the inner screw threads of said tubular means; said rod carrying gas tight washers at both extremities and being adapted to define and open and close a passage way for gas at one of its extremities; and manual means mounted at the other end of said actuator rod for controlling the flow of said gas to said customer appliance.

* * * * *